United States Patent
Doshita et al.

(10) Patent No.: US 6,724,613 B2
(45) Date of Patent: Apr. 20, 2004

(54) DOOR-USE FEED PROTECTOR AND A CIRCUIT ASSEMBLY ARRANGING STRUCTURE USING THE SAME

(75) Inventors: Kenichi Doshita, Shizuoka (JP); Tohru Aoki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/321,431

(22) Filed: Dec. 18, 2002

(65) Prior Publication Data
US 2003/0160678 A1 Aug. 28, 2003

(30) Foreign Application Priority Data
Feb. 22, 2002 (JP) .......................... 2002-046114

(51) Int. Cl.[7] .............. H05K 5/02; H05K 7/14; H02G 3/00
(52) U.S. Cl. ............ 361/679; 361/601; 174/72 A; 174/135; 174/136; 174/70 R; 174/69; 296/155
(58) Field of Search ................ 361/601, 679; 174/72 A, 135, 136, 72 C, 70 R, 69; 337/34, 212; 296/152, 155

(56) References Cited

U.S. PATENT DOCUMENTS

| 5,164,546 A | * | 11/1992 | Kumagai ................ 174/135 |
| 5,466,036 A | * | 11/1995 | Stroeters et al. ........... 296/208 |
| 5,879,047 A | * | 3/1999 | Yamaguchi et al. ..... 296/146.7 |
| 5,921,782 A | * | 7/1999 | Yamaguchi et al. ........... 439/34 |
| 6,076,883 A | * | 6/2000 | Labonde et al. ............ 296/155 |
| 6,079,764 A | * | 6/2000 | Suzuki et al. ............ 296/146.1 |
| 6,107,570 A | * | 8/2000 | Suzuki et al. ............. 174/72 A |
| 6,217,375 B1 | * | 4/2001 | Nagai et al. ................ 439/501 |
| 6,515,229 B2 | * | 2/2003 | Aoki et al. ................ 174/72 A |
| 6,603,076 B2 | * | 8/2003 | Doshita et al. ........... 174/72 A |
| 2002/0046863 A1 | * | 4/2002 | Heranney ................ 174/65 G |
| 2002/0151213 A1 | * | 10/2002 | Aoki et al. ................. 439/502 |
| 2003/0184119 A1 | * | 10/2003 | Doshita et al. ............. 296/155 |

FOREIGN PATENT DOCUMENTS

| JP | 2000142269 A | * | 5/2000 | .......... B60R/16/02 |
| JP | 2001101932 A | * | 4/2001 | ............ H01B/7/00 |

* cited by examiner

Primary Examiner—Anatoly Vortman
(74) Attorney, Agent, or Firm—Armstrong, Kratz, Quintos, Hanson and Brooks, LLP

(57) ABSTRACT

A door-use feed protector and a circuit assembly arranging structure using the same is provided. The door-use feed protector includes a protector body to accommodate a circuit assembly in a curved state in a door and a circuit assembly holding portion provided on an outer wall of the protector body so as to hold a portion of the circuit assembly outside the protector body. The circuit assembly holding portion may be an auxiliary protector. The auxiliary protector has at least a pair of holding walls facing each other. The holding wall is provided with a resilient holding piece or an engagable cover for preventing the circuit assembly from protruding. The circuit assembly is introduced in the protector body of the door-use feed protector, and a portion of the circuit assembly led out of the protector body is held by the circuit assembly holding portion and is arranged toward an auxiliary in the door.

10 Claims, 3 Drawing Sheets

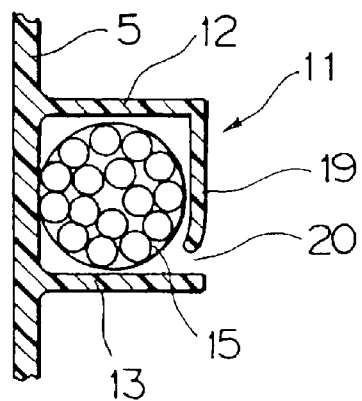
F I G. 3
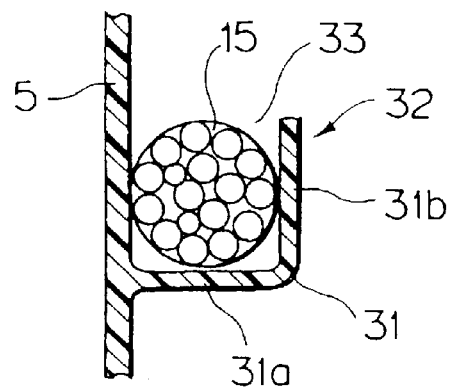
F I G. 5
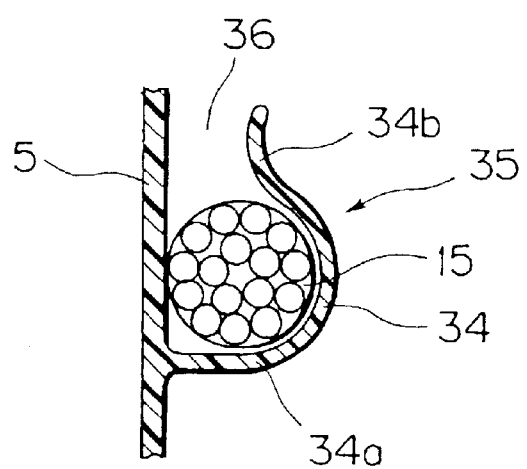
F I G. 6

DOOR-USE FEED PROTECTOR AND A CIRCUIT ASSEMBLY ARRANGING STRUCTURE USING THE SAME

BACKGROUND OF THE INVENTION

1. Field of the Invention

The present invention relates generally to a structure to make a protector body provided in a sliding door of, for example, a motor vehicle accommodate a power feeding wiring harness (a circuit assembly) extending from a vehicle body side and, more particularly, to a door-use feed protector and a circuit assembly arranging structure using the same wherein a wiring harness outside the protector body can also be protected in the sliding door.

2. Description of the Related Art

In a sliding door of a motor vehicle, various auxiliaries such as a powerwindow unit, a door lock unit, a speaker, an automatic door opening-and-closing unit are installed. For supplying power current or signal current to the auxiliaries from a battery carried on a vehicle body regardless of a opening-and-closing state of the sliding door, a circuit assembly such as a wiring harness (electric wires) or a cabtire cable is arranged on the sliding door from the vehicle body side.

The circuit assembly is received in a curved state in the protector provided on the sliding door made of synthetic resin so that a slack of the circuit assembly caused by the opening or closing of the sliding door can be absorbed. Here, it has been suggested that the circuit assembly is upwardly energized by an elastic member such as a flat spring to absorb the slack in the protector.

Simultaneously, for a turning door of a sedan, a structure to accommodate the circuit assembly such as the wiring harness in a protector provided on the door in a curved state has been suggested.

With respect to the above prior art, however, a circuit assembly or object such as an electric wire outside the protector in the sliding door is likely to interferes with a panel, structures, or auxiliaries in the sliding door, whereby the circuit assembly would be worn away or broken due to the vibration of a vehicle.

And also, in the turning door, when a protector for protecting the circuit assembly is provided in the door, the similar problem exists.

SUMMARY OF THE INVENTION

In view of the foregoing, an object of the present invention is to provide a door-use feed protector and a circuit assembly arranging structure using the same wherein an interference between a circuit assembly, such as an electric wire or a wiring harness, arranged outside the protector and other outside objects can be prevented.

In order to achieve the above object, as a first aspect of the present invention, a door-use feed protector comprises: a protector body to accommodate a circuit assembly in a curved state in a door; and a circuit assembly holding portion provided on an outer wall of the protector body so as to hold a portion of the circuit assembly outside the protector body.

As a second aspect of the present invention, based on the first aspect, the circuit assembly holding portion is an auxiliary protector to receive the circuit assembly.

As a third aspect of the present invention, based on the second aspect, the auxiliary protector has at least a pair of holding walls facing each other.

As a fourth aspect of the present invention, based on the second aspect, the auxiliary protector is a holding wall having a hook-shaped cross-section.

As a fifth aspect of the present invention, based on the third aspect, the holding wall is provided with a resilient holding piece or an engagable cover for preventing the circuit assembly from protruding.

As a sixth aspect of the present invention, based on any one of the third to fifth aspects, the holding wall forms a circuit assembly insertion opening having a width smaller than a diameter of the circuit assembly.

As a seventh aspect of the present invention, a circuit assembly arranging structure using a door-use feed protector is characterized in that; a circuit assembly is introduced in the protector body of the door-use feed protector with any one of the first to eighth aspects, and a portion of the circuit assembly led out of the protector body is held by the circuit assembly holding portion and is arranged toward an auxiliary in a door.

As an eighth aspect of the present invention, based on the seventh aspect, the door is a sliding door of a motor vehicle.

According to the above-described structures of the present invention, the following advantages are provided.

(1) According to the first aspect of the invention, because a portion of the circuit assembly outside the protector body is held by the circuit assembly holding portion, the portion outside the protector body does not interfere with the structures or the auxiliaries in the door. Therefore, wear or breakage of the circuit assembly is prevented, and reliability of the power feeding from a vehicle body to the door is improved. Because the circuit assembly can be arranged in the circuit assembly holding portion without detouring around the protector body, the total length of the circuit assembly is shortened, thereby attaining a space saving, a cost reduction, and a light-weighing.

(2) According to the second aspect of the invention, because a portion of the circuit assembly outside the protector body is accommodated in the auxiliary protector, the portion outside the protector body does not interfere with the structures or the auxiliaries in the door. Therefore, wear or breakage of the circuit assembly is prevented, and reliability of the power feeding from a vehicle body to the door is improved. Because the circuit assembly can be arranged in the auxiliary protector without detouring around the protector body, the total length of the circuit assembly is shortened, thereby attaining space saving, cost reduction, and light-weighing. Because the rigidity of the protector body is enhanced by the auxiliary protector, bending or deformation of the outer wall of the protector body is prevented. Therefore, the circuit assembly can smoothly move in the protector body when the door is opened or closed.

(3) According to the third aspect of the invention, because a portion of the circuit assembly outside the protector body is accommodated between the pair of holding walls, for example, in a horizontal direction, the portion can be held among the holding walls and a door panel or a door trim without protruding therefrom. Therefore, the structure of the auxiliary protector is simplified, and the cost of the protector is reduced.

(4) According to the fourth aspect of the invention, because the circuit assembly can be stably placed in the hook-shaped holding wall due to the weight of the circuit assembly, the structure of the auxiliary protector is simplified and the cost is reduced.

(5) According to the fifth aspect of the invention, because the circuit assembly in the auxiliary protector can be more securely held by the holding piece or the cover, protrusion of the circuit assembly, caused by vibration of a vehicle or the like, can be securely prevented.

(6) According to the sixth aspect of the invention, because the circuit assembly insertion opening is widened by outwardly bending the holding wall, the circuit assembly can be easily inserted into the circuit assembly holding assembly. Therefore, insertion workability of the circuit assembly is improved. Because the holding wall resiles to the original position, protrusion of the circuit assembly is prevented.

(7) According to the seventh aspect of the invention, because a portion of the power feeding circuit assembly having passed through the protector body can be arranged toward the auxiliaries in the door with a shortest distance, the length of the circuit assembly can be shortened, thereby attaining a space saving, a cost reduction, and a light-weighing. Wear or breakage of the circuit assembly is prevented, and reliability of the power feeding from a vehicle body to the door is improved.

(8) According to the eighth aspect of the invention, because a slack of the circuit assembly due to the opening-and-closing of the sliding door is absorbed in the protector body, a sandwiching of the circuit assembly between the sliding door and a vehicle body and breakage caused by the sandwiching is prevented. Therefore, feeding reliability of the circuit assembly along the protector body and the circuit assembly holding portion is improved.

The above and other objects and features of the present invention will become more apparent from the following description taken in conjunction with the accompanying drawings.

BRIEF DESCRIPTION OF THE DRAWINGS

FIG. 3 is a cross-sectional view showing an auxiliary protector of FIG. 2.

FIG. 5 is a cross-sectional view showing a main portion of a third embodiment of the auxiliary protector.

FIG. 6 is a cross-sectional view showing a main portion of a fourth embodiment of the auxiliary protector.

DESCRIPTION OF THE PREFERRED EMBODIMENT(S)

Embodiment(s) of the present invention will now be described in further detail with reference to the accompanying drawings.

Figure 1:
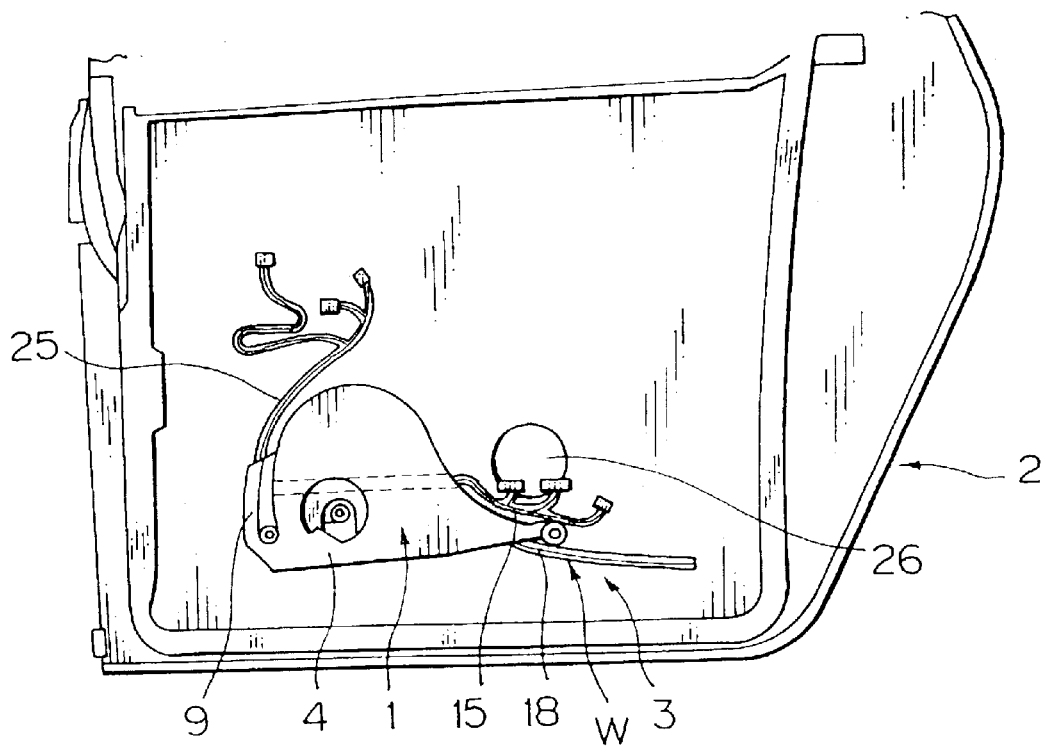
FIG. 1 is a front view showing an embodiment of the inventive door-use feed protector and the circuit assembly arranging structure using the same.

As shown in FIG. 1, a sliding door-use feed protector (hereinafter "protector") 1 is fixed to a door panel (an inner panel) 3, made of metal, of a sliding door (a door) 2. A door trim (not shown) made of synthetic resin is attached to the door panel 3 facing an outer wall 4, near the interior of a vehicle, of the protector 1.

Figure 2:
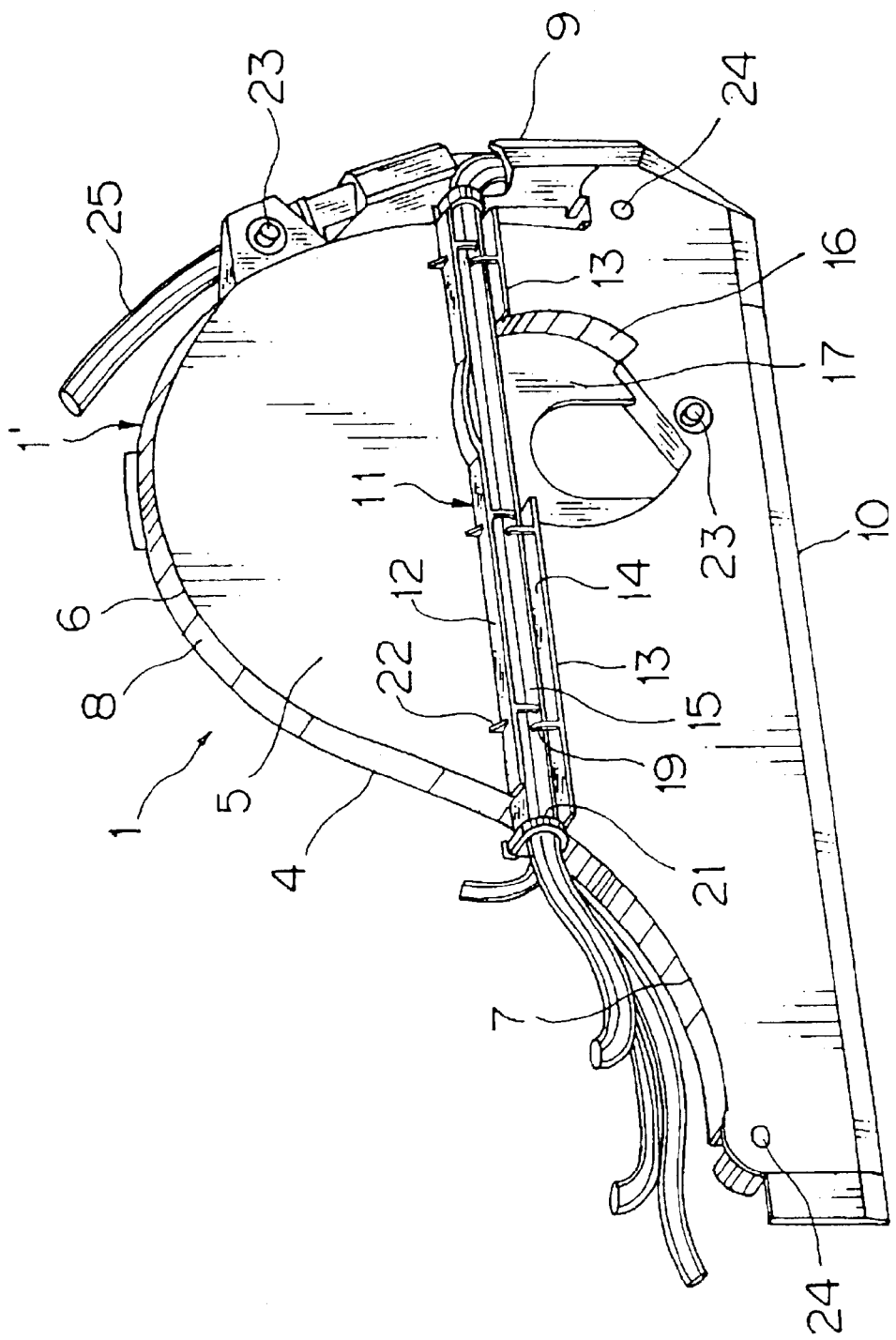
FIG. 2 is a perspective view showing the door-use feed protector.

The protector 1 is formed of synthetic resin. As shown in FIG. 2, the protector 1 consists of a generally semi-circular portion 6 and a rear extending portion 7. The protector 1 has outer side and inner side vertical wall portions (outer walls) 4,5, a narrow peripheral wall 8 connecting the wall portions 4,5 at the upper and the front portions thereof, a generally-tubular first harness leading-out port 9, and a second harness leading-out port 10 which is located at the bottom and longitudinally extends. The wall portion 4 at the outer side of a vehicle is made of synthetic resin as a recessed bottom of a casing for example, and the wall portion 5 at the inner side of a vehicle is formed as a flat cover of the casing.

On the surface of the wall portion 5 which is near the door panel, holding walls 12,13 made of synthetic resin are longitudinally formed as an auxiliary protector (a circuit assembly holding portion) 11. A gutter-like circuit assembly insertion space 14 is formed between the holding walls 12,13. A portion, not accommodated in the protector body 1', of the wiring harness (the circuit assembly) 15 is arranged in the insertion space 14. The protector body 1' is a portion of the protector 1, which portion does not include the auxiliary protector 11.

The auxiliary protector 11 has a U-like cross-section with a pair of holding walls 12,13 and, the wall portion 5. Each of the holding walls 12,13 perpendicularly stands on the wall portion 5. The auxiliary protector 11 is located at a vertical middle position of the protector body 1'. The front end of each of the holding walls 12,13 is generally positioned at the front end of the protector body 1', and the rear end of each of the holding walls 12,13 reaches the curved peripheral wall 8 of the protector body 1'. A projecting height of each of the holding walls 12,13 is almost the same as the thickness of the protector body 1'.

A generally circular wall portion 16 is put through the protector 1 in its thickness direction in the vicinity of the center of generally semi-circular portion 6 so as to enhance the rigidity of the protector body 1'. A vertical partition wall and a recess space (both being shown with reference 17) are formed inside the wall portion 16. The upper holding wall 12 is curved along the circular wall portion 16, and the lower holding wall 13 is cut off by the recess space 17.

Because the holding walls 12,13 are formed integrally with the wall portion 16, the rigidity of the protector 1 is enhanced. That is, a bending of the wall portion 5 of the protector 1 is prevented. Therefore, an accommodation of the wiring harness 18 (FIG. 1) into an inside space of the protector 1 can be smoothly carried out.

The rigidity of the protector body 1' is also enhanced by the holding walls 12,13 provided on the wall portion 5 of the protector body 1'.

The location of the pair of horizontal and parallel holding walls 12,13 may be upper than the generally circular wall portion 16 or lower than the wall portion 16. The holdings walls 12,13 may be obliquely or vertically arranged in accordance with an arrangement of the wiring harness (the circuit assembly) 5. The holding walls 12,13 may not be straight.

Resilient holding pieces 19 to prevent the wiring harness 15 from falling out or protruding project from the distal ends of the holding walls 12,13 over a slit-like opening (reference 14 is also applied). As shown in FIG. 3, each holding piece 19 orthogonally projects from the holding walls 12,13, and a gap 20 for inserting the wiring harness is left between an inner surface of the holding wall 12(13) and the tip of the holding piece 19. The holding piece 19 on the holding wall 12 and the holding piece 19 on the holding wall 13 are arranged nearby each other.

A band member 21 (FIG. 2) made of synthetic resin is provided on either longitudinal end portion of the auxiliary protector 11 so as to fix the wiring harness 15. The band member 21 may be formed integrally with the end portions of one of the holding walls 12,13. The band member 21 may be formed integrally with the wall portion 5 or the peripheral wall 8 of the protector body 1'.

As shown in FIG. 3, the holding piece 19 has a curved end so as to hold the wiring harness 15, thereby securely preventing the wiring harness 15 from protruding. The length of the holding piece 19 should be shorter than the height of the holding walls 12,13 so that the wiring harness 15 can be easily inserted between the holding walls 12,13. The holding piece 19 projects perpendicularly from the holding walls 12,13 and has a resilience.

Each holding wall 12,13 is reinforced on the wall portion 5 of the protector body 1' by means of reinforcement pieces 22 (FIG. 2). The reinforcement pieces 22 prevent the holding walls 12,13 from falling down or being deformed.

Engaging clips 23 and bolt holes 24 (FIG. 2) to fix the protector body 1' to the door panel 3 are provided on the wall portion 5 of the protector body 1'. The engaging clip 23 has a resilient claw portion (not shown) which engages the door panel 3. The protector 1 is further fixed to the door panel 3 by means of bolts (not shown) by using the bolt holes 24.

Referring to FIG. 1, the wiring harness 18 led out of the lower opening 10 of the protector 1 is led toward a non-shown vehicle body side (a battery side) and connected with another wiring harness on a vehicle body (not shown) by means of a connector. The wiring harness 18 is upwardly pushed by a non-shown flat spring (an elastic member) in the protector 1 and upwardly bent in the protector 1. The wiring harness 18 is upwardly led out of a front leading-out port 9 toward the auxiliaries in the sliding door 2 and connected therewith by means of connectors.

A portion 15 of the wiring harness 25 led out from the front leading-out port 9 is arranged in the auxiliary protector 11 as shown in FIG. 1.

With the above structure, an arranging length of the wiring harness 15 is shortened, thereby attaining a space saving in the sliding door and a light-weighing and cost reduction of the wiring harness 15. Because the wiring harness 15 is received in the auxiliary protector 11, the wiring harness 15 is prevented from interfering with other structures and the auxiliaries in the door, thereby preventing wear or breakage of the wiring harness 15.

Referring to FIG. 1, the portion of the wiring harness 15 arranged in the auxiliary protector 11 is connected to, for example, a motor 26 of an automatic door opening-closing unit which is one of the auxiliaries in the sliding door. The auxiliaries in the sliding door also includes a speaker, a powerwindow motor, a door lock motor, and the like. The wiring harnesses 15,25 separated in the protector 1 are selectively connected to the nearest auxiliaries.

Another wiring harness (not shown) not led from the protector 1 can also be arranged in the auxiliary protector 11.

The protector 1 is installed inside the sliding door 2 as follows. The wiring harness 18 is curvedly arranged in the protector body 1', and the wiring harness 15 for a branch is also arranged in the auxiliary protector 11. That is, the protector 1 and the whole wiring harness W including the wiring harnesses 15,18,25 is to be assembled as a wiring harness assembly first so that the wiring harness assembly can be easily attached to the sliding door 2. When the protector 1 is attached to the sliding door 2, the wiring harness W can be arranges in the auxiliary protector 11.

Referring to FIG. 1, the auxiliary protector 11 can be provided on the wall portion 4 (the door trim side) instead of the wall portion 5. In this case, the wiring harness 15 can be easily arranged in the auxiliary protector 11 after having fixed the protector 1 to the door panel 3.

Further, the auxiliary protector 11 can be provided on both the wall portions 4,5 of the protector body 1'. Still further, a plurality of parallel or crossing auxiliary protectors 11 can be arranged on both the wall portions 4,5 of the protector body 1'. This structure enables the wiring harness W to be applied to a lot of auxiliaries and circuits.

Figure 4:
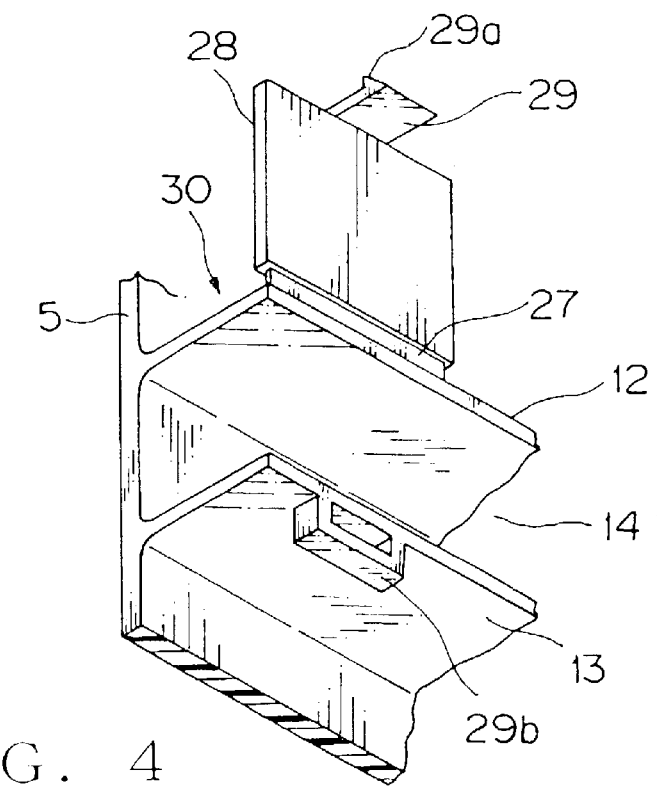
FIG. 4 is a perspective view showing a main portion of a second embodiment of the auxiliary protector.

In place of the holding piece 19 of the auxiliary protector 11 of FIG. 3, a cover 28 may be rotatably and integrally provided on the holding wall 12 through a thin hinge 27 as shown in FIG. 4. In this case, a frame portion 29b to engage an engaging claw piece 29 of the above cover 28 is integrally provided on the holding wall 13. In the following embodiments, the same references are given to the same elements as those of FIG. 2, and the description thereof is omitted.

The cover 28 covers the opening 14 formed with the pair of holding walls 12,13. The cover 28 may have the same length as the holding wall 12, or the cover 28 may consist of some divided portions. The claw portion 29a of the engaging claw piece 29 has a resilience and engages the frame portion 29b. The wiring harness 15 (FIG. 3) in the auxiliary protector 30 can be prevented from coming out thereof by means of the cover 28 and the engaging means 29,29b.

Further, as shown in FIG. 5, an auxiliary protector 32 having a hook-like cross-section can be applied, wherein a holding wall 31 having an L-shaped cross-section projects from the wall portion 5 of the protector body. The holding wall 31 consists of a bottom wall 31a standing on the wall portion 5 of the protector body and a sidewall 31b perpendicularly extending from the bottom wall 31a. The wiring harness 15 is prevented from coming out of an upper opening 33 of the auxiliary protector 32 due to its weight. The holding pieces 19 (FIG. 3) or the cover 28 (FIG. 4) may be provided on the sidewall portion 31b of the holding wall 31.

Still further, as shown in FIG. 6, an auxiliary protector 35 having a hook-like cross-section can be applied, wherein a holding wall 34 having an S-shaped cross-section projects from the wall portion 5 of the protector body. The holding wall 34 has a wall portion 34a which is inwardly curved and a wall portion 34b which continues from the wall portion 34a and is outwardly curved. At least the upper the wall portion 34b has a resilience so that an upper opening (a circuit assembly insertion opening) 36 can change.

Because the width of the upper opening 36 of the auxiliary protector 35 is smaller than the diameter of the wiring harness 15 normally, the wiring harness 15 is prevented from coming out of the auxiliary protector 35. Here, a wall portion similar to the wall portion 34b of FIG. 6 can be added to the top end of the holding wall 31 of FIG. 5. Further, the pair of holding walls 12,13 of FIG. 2 can be replaced with a pair of holding walls 34 of FIG. 6.

A plurality of each of auxiliary protectors 30,32,35 shown in FIG. 4–FIG. 6, respectively, may be arranged on the protector body 1' in a manner similar to the auxiliary protector 11 of FIG. 2–FIG. 3.

The auxiliary protectors 11,30,32,35 shown in FIG. 2–FIG. 6 each may be molded separately from the protector body 1' in a U-shape. Each of the separated auxiliary protectors 11,30,32,35 may be attached to the protector body 1' by an engaging or fixing means such as an engaging clip or a bolt.

The auxiliary protector 11 may be replaced with a plurality of parallel bar-projections as the circuit assembly holding portion. In this case, the bar-projections act as the holding walls 12,13 of the auxiliary protector 11. The bar-projections may be in a L-shape or a hook-like shape in a manner similarly to the embodiments shown in FIG. 5 and FIG. 6.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A door-use feed protector, comprising:
   a protector body to accommodate a circuit assembly in a curved state in a door; and
   a circuit assembly holding portion provided on an outer wall of the protector body so as to hold a portion of the circuit assembly outside the protector body.

2. The door-use feed protector as set forth in claim 1, wherein
   the circuit assembly holding portion is an auxiliary protector to receive the circuit assembly.

3. The door-use feed protector as set forth in claim 2, wherein
   the auxiliary protector has at least a pair of holding walls facing each other.

4. The door-use feed protector as set forth in claim 2, wherein
   the auxiliary protector is a holding wall having a hook-shaped cross-section.

5. The door-use feed protector as set forth in claim 3, wherein
   the holding wall is provided with a resilient holding piece or an engagable cover for preventing the circuit assembly from protruding.

6. The door-use feed protector as set forth in claim 3, wherein
   the holding wall forms a circuit assembly insertion opening having a width smaller than a diameter of the circuit assembly.

7. The door-use feed protector as set forth in claim 4, wherein
   the holding wall forms a circuit assembly insertion opening having a width smaller than a diameter of the circuit assembly.

8. The door-use feed protector as set forth in claim 5, wherein
   the holding wall forms a circuit assembly insertion opening having a width smaller than a diameter of the circuit assembly.

9. A circuit assembly arranging structure using a door-use feed protector, wherein
   a circuit assembly is introduced in the protector body of the door-use feed protector set forth in any one of claims 1–8, and
   a portion of the circuit assembly led out of the protector body is held by the circuit assembly holding portion and is arranged toward an auxiliary in a door.

10. The circuit assembly arranging structure using the door-use feed protector as set forth in claim 9, wherein
    the door is a sliding door of a motor vehicle.

* * * * *